(12) United States Patent
Miyazaki et al.

(10) Patent No.: US 10,291,948 B2
(45) Date of Patent: May 14, 2019

(54) NETWORK DEVICE, INFORMATION PROCESSING METHOD, AND HDMI DEVICE

(71) Applicant: SONY CORPORATION, Tokyo (JP)

(72) Inventors: Satoshi Miyazaki, Kanagawa (JP); Gen Ichimura, Tokyo (JP); Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 15/556,829

(22) PCT Filed: Mar. 16, 2016

(86) PCT No.: PCT/JP2016/058348
§ 371 (c)(1),
(2) Date: Sep. 8, 2017

(87) PCT Pub. No.: WO2016/152681
PCT Pub. Date: Sep. 29, 2016

(65) Prior Publication Data
US 2018/0054644 A1 Feb. 22, 2018

(30) Foreign Application Priority Data
Mar. 20, 2015 (JP) ................. 2015-058792

(51) Int. Cl.
*H04N 7/16* (2011.01)
*H04N 21/41* (2011.01)
(Continued)

(52) U.S. Cl.
CPC ......... *H04N 21/4108* (2013.01); *G06F 13/00* (2013.01); *G06F 17/30424* (2013.01);
(Continued)

(58) Field of Classification Search
CPC .......... H04N 21/4108; H04N 21/2265; H04N 21/43635
(Continued)

(56) References Cited

U.S. PATENT DOCUMENTS 8,175,298 B2 * 5/2012 Mitani ............... H04N 5/44
348/734
8,201,211 B2 * 6/2012 Proust ............... G06F 21/575
707/999.203

(Continued)

FOREIGN PATENT DOCUMENTS

CN 102835070 A 12/2012
EP 2048882 A1 4/2009
(Continued)

OTHER PUBLICATIONS

International Search Report and Written Opinion of PCT Application No. PCT/JP2016/058348, dated May 31, 2016, 09 pages ISRWO.

*Primary Examiner* — Michael B. Pierorazio
(74) *Attorney, Agent, or Firm* — Chip Law Group

(57) ABSTRACT

It is made possible to easily acquire and use various kinds of information of each HDMI device in an HDMI cluster. A database in which at least an HDMI CEC logical address, an HDMI CEC physical address, and acquisition destination information for acquiring unique information are registered for each HDMI device in an HDMI cluster is included. A processing unit performs processing using this database. For example, the processing unit transmits the database to an external device. Also, for example, the processing unit displays an HDMI device in an HDMI cluster, a connection status thereof, and unique information of each HDMI device on the basis of this database.

20 Claims, 16 Drawing Sheets

(51) Int. Cl.
  *G06F 13/00*     (2006.01)
  *H04N 21/436*    (2011.01)
  *G06F 17/30*     (2006.01)
  *H04N 21/226*    (2011.01)
  *H04N 21/4363*   (2011.01)

(52) U.S. Cl.
  CPC ....... *H04N 21/2265* (2013.01); *H04N 21/436* (2013.01); *H04N 21/43635* (2013.01)

(58) Field of Classification Search
  USPC ........................................................ 725/143
  See application file for complete search history.

(56) References Cited

U.S. PATENT DOCUMENTS

| | | | | |
|---|---|---|---|---|
| 8,351,624 B2* | 1/2013 | Motomura | ............... | H04N 5/60 348/705 |
| 8,838,911 B1* | 9/2014 | Hubin | ............... | H04N 5/76 711/147 |
| 9,729,928 B2* | 8/2017 | Kim | ............... | H04N 21/4302 |
| 2006/0161958 A1* | 7/2006 | Choung | ............... | G09G 3/2092 725/80 |
| 2007/0046835 A1* | 3/2007 | Kim | ............... | H04N 5/4403 348/731 |
| 2008/0063216 A1* | 3/2008 | Sakata | ............... | H04R 27/00 381/80 |
| 2008/0320545 A1* | 12/2008 | Schwartz | ............... | H04N 7/17318 725/135 |
| 2009/0284656 A1* | 11/2009 | Suzuki | ............... | H04L 12/2809 348/554 |
| 2009/0296731 A1* | 12/2009 | Lida | ............... | G06F 3/1454 370/449 |
| 2010/0315553 A1* | 12/2010 | Takatsuji | ............... | G06F 21/10 348/516 |
| 2010/0321479 A1* | 12/2010 | Yang | ............... | H04N 13/0051 348/51 |
| 2011/0051002 A1* | 3/2011 | Oh | ............... | H04N 5/765 348/569 |
| 2011/0068736 A1* | 3/2011 | Chartier | ............... | H02J 7/0052 320/107 |
| 2011/0113442 A1* | 5/2011 | Kikkawa | ............... | G09G 5/006 725/25 |
| 2011/0134338 A1* | 6/2011 | Toba | ............... | H04L 12/282 348/734 |
| 2011/0142245 A1* | 6/2011 | Toba | ............... | G11B 20/10527 381/22 |
| 2011/0176057 A1* | 7/2011 | Okamura | ............... | H04N 5/44 348/554 |
| 2011/0234916 A1* | 9/2011 | Fujita | ............... | H04N 5/60 348/738 |
| 2012/0002562 A1* | 1/2012 | Kawade | ............... | H04N 5/765 370/252 |
| 2012/0030728 A1* | 2/2012 | Yukawa | ............... | H04N 21/4432 725/151 |
| 2012/0042346 A1* | 2/2012 | Yoshida | ............... | H04N 21/4122 725/81 |
| 2012/0136612 A1* | 5/2012 | Vanderhoff | ............ | H04N 5/765 702/119 |
| 2012/0188456 A1* | 7/2012 | Kuroyanagi | ........... | H04N 5/765 348/569 |
| 2012/0307157 A1* | 12/2012 | Utsunomiya | ......... | H04N 5/775 348/707 |
| 2013/0014184 A1* | 1/2013 | Mank | ............... | H04L 12/2809 725/80 |
| 2013/0021536 A1* | 1/2013 | Kamida | ............... | H04N 21/43622 348/739 |
| 2013/0051578 A1* | 2/2013 | Chu | ............... | H04B 15/00 381/94.1 |
| 2013/0051584 A1* | 2/2013 | Higuchi | ............... | H04N 21/4122 381/123 |
| 2013/0223538 A1* | 8/2013 | Wang | ............... | H04N 21/4307 375/240.25 |
| 2013/0292311 A1* | 11/2013 | Shaw | ............... | E03F 5/042 210/121 |
| 2014/0193134 A1* | 7/2014 | Maeda | ............... | G11B 20/10009 386/231 |
| 2014/0337879 A1* | 11/2014 | Arling | ............... | H04N 21/812 725/32 |
| 2015/0077633 A1* | 3/2015 | Lee | ............... | H04N 21/4307 348/515 |

FOREIGN PATENT DOCUMENTS

| | | |
|---|---|---|
| EP | 2553876 A1 | 2/2013 |
| EP | 2824871 A1 | 1/2015 |
| JP | 2003-178272 A | 6/2003 |
| JP | 2008-035192 A | 2/2008 |
| JP | 2008-35192 A | 2/2008 |
| JP | 2013-531824 A | 8/2013 |
| TW | 200822749 A | 5/2008 |
| WO | 2008/013132 A1 | 1/2008 |
| WO | 2011/120963 A1 | 10/2011 |

* cited by examiner

FIG. 3

DATABASE 1

| Date & Time | Logical address | Physical address | Power Status | Active Source | System Audio Status | OSD Name | Proxy Device | IP address | Network ID | URL |
|---|---|---|---|---|---|---|---|---|---|---|
| Jan.20.2015 17:00 | 0 | 0.0.0.0 | On | - | On | XXX TV-01 | - | - | A | www.xxx.co.jp/info/tv01 |
| Jan.20.2015 17:00 | 4 | 1.0.0.0 | On | - | On | YYY STB-01 | - | - | A | www.yyy.com |
| Jan.20.2015 17:00 | 5 | 2.0.0.0 | On | O | Off | XXX AVR-01 | O | 192.168.1.7 | A | www.xxx.co.jp/info/avr01 |
| Jan.22.2015 23:02 | 0 | 0.0.0.0 | Off | - | Off | XXX TV-02 | O | 192.168.1.10 | B | www.xxx.co.jp/info/tv02 |
| Jan.22.2015 23:02 | 4 | 1.0.0.0 | Off | - | Off | XXX DVD-01 | - | - | B | www.xxx.co.jp/info/dvd01 |
| Jan.22.2015 22:00 | 0 | 0.0.0.0 | On | - | Off | XXX TV-03 | - | - | C | www.xxx.co.jp/info/tv03 |
| Jan.22.2015 22:00 | 4 | 1.0.0.0 | On | - | Off | XXX GAME-01 | - | - | C | www.xxx.co.jp/info/game01 |
| Jan.22.2015 22:00 | 8 | 2.0.0.0 | On | O | Off | XXX BD-02 | O | 192.168.1.4 | C | www.xxx.co.jp/info/bd02 |

FIG. 8

DATABASE 2
(UNIQUE INFORMATION OF DEVICE BD-02 OF XXX COMPANY)

| DEVICE CATEGORY | Blu-ray Player | |
|---|---|---|
| MANUFACTURER NAME | XXX | |
| PRODUCT NAME | BD-02 | |
| CORRESPONDING OPERATION KEY | Power | MENU |
| | Play | OPTION |
| | Stop | HOME |
| | Pause | EPG |
| | Rec | BLUE |
| | FF | RED |
| | REW | GREEN |
| | NEXT | YELLOW |
| | PREVIOUS | UP |
| | VOLUME+ | RIGHT |
| | VOLUME- | DOWN |
| | CHANNEL+ | LEFT |
| | CHANNEL- | SELECT |
| ICON FILE | BD-02.jpg | |
| PRODUCT INFORMATION SITE | http://www.xxx.co.jp/bd/products/bd-02/ | |

CONTROL OPERATION ON CONTENT REPRODUCTION

NETWORK DEVICE, INFORMATION PROCESSING METHOD, AND HDMI DEVICE

CROSS REFERENCE TO RELATED APPLICATIONS

This application is a U.S. National Phase of International Patent Application No. PCT/JP2016/058348 filed on Mar. 16, 2016, which claims priority benefit of Japanese Patent Application No. JP 2015-058792 filed in the Japan Patent Office on Mar. 20, 2015. Each of the above-referenced applications is hereby incorporated herein by reference in its entirety.

TECHNICAL FIELD

This invention relates to a network device, an information processing method, and an HDMI device.

BACKGROUND ART

It has been proposed to perform processing based on a database in which an HDMI CEC logical address, an HDMI CEC physical address, and the like of each HDMI device are registered in association with a home network including an HDMI cluster (HDMI network) formed in each room (see, for example, Patent Document 1). For example, it becomes possible to display, for each HDMI cluster, an HDMI device in the HDMI cluster and a connection status of this HDMI device on a mobile device on the basis of this database.

CITATION LIST

Patent Document

Patent Document 1: JP 2013-531824 A

SUMMARY OF THE INVENTION

Problems to be Solved by the Invention

The present technology is to make it possible to easily acquire and use various kinds of information of each HDMI device in an HDMI cluster.

Solutions to Problems

A concept of the present technology is a network device including: a database in which at least an HDMI CEC logical address, an HDMI CEC physical address, and acquisition destination information for acquiring unique information are registered for each HDMI device in an HDMI cluster; and a processing unit to perform processing using the database.

In the present technology, a network device includes a database. In this database, at least an HDMI CEC logical address, an HDMI CEC physical address, and acquisition destination information for acquiring unique information are registered for each HDMI device in an HDMI cluster. For example, the acquisition destination information may be a URL.

The processing unit performs processing using the database. For example, the processing unit may transmit the database to an external device. In this case, for example, the external device may be a mobile device.

Also, for example, the processing unit may perform processing of displaying an HDMI device in an HDMI cluster and a connection status thereof on the basis of an HDMI CEC logical address and an HDMI CEC physical address and may perform processing of acquiring and displaying unique information of a user-designated HDMI device on the basis of acquisition destination information. In this case, for example, an operation unit to perform control operation on the user-designated HDMI device on the basis of a display by acquisition of the unique information may be further included.

In such a manner, for each HDMI device in each HDMI cluster included in a network, acquisition destination information for acquiring unique information is registered in a database together with an HDMI CEC logical address and an HDMI CEC physical address in the present technology. Thus, it becomes possible to easily acquire and use various kinds of information of each HDMI device, which is included in each HDMI cluster, in the HDMI device itself or an external device on the basis of this database.

Also, a different concept of the present technology is a network device including: a reception unit to receive a database, in which at least an HDMI CEC logical address, an HDMI CEC physical address, and acquisition destination information for acquiring unique information are registered, from an external device via IP communication; and a processing unit to perform processing of displaying an HDMI device in an HDMI cluster and a connection status of the HDMI device on the basis of the HDMI CEC logical address and the HDMI CEC physical address and to perform processing of acquiring and displaying unique information of a user-designated HDMI device on the basis of the acquisition destination information.

In the present technology, a database in which at least an HDMI CEC logical address, an HDMI CEC physical address, and acquisition destination information for acquiring unique information are registered is received by a reception unit from an external device via IP communication. For example, the acquisition destination information may be a URL.

The processing unit performs processing of displaying an HDMI device in an HDMI cluster and a connection status of the HDMI device on the basis of an HDMI CEC logical address and an HDMI CEC physical address. Also, this processing unit performs processing of acquiring and displaying unique information of a user-designated HDMI device on the basis of acquisition destination information. For example, an operation unit to perform control operation on the user-designated HDMI device on the basis of a display by acquisition of the unique information may be further included.

In such a manner, acquisition destination information for acquiring unique information is registered in a database, which is received from an external device, together with an HDMI CEC physical address and an HDMI CEC logical address in the present technology. Thus, it becomes possible to easily acquire various kinds of information of each HDMI device included in an HDMI cluster and to perform utilization thereof for displaying or control operation on the basis of this database.

Also, a different concept of the present technology is an HDMI device included in an HDMI cluster, the device including: a registration unit to generate a database by registering at least an own HDMI CEC logical address, HDMI CEC physical address, and acquisition destination information for acquiring unique information; and a communication unit to transmit the database created in the registration unit to a different HDMI device included in the HDMI cluster via CEC communication or IP communication.

In the present technology, the registration unit creates a database by registering at least an own HDMI CEC logical address, HDMI CEC physical address, acquisition destination information for acquiring unique information. For example, the acquisition destination information may be a URL. The communication unit transmits the database created in the registration unit to a different HDMI device included in the HDMI cluster via CEC communication or IP communication.

In such a manner, in the present technology, at least an own HDMI CEC logical address, HDMI CEC physical address, and acquisition destination information for acquiring unique information are registered and a database is created. The database is transmitted to a different HDMI device included in the HDMI cluster via CEC communication or IP communication. Thus, it becomes possible to generate a database of the HDMI cluster, in which database databases of HDMI devices are integrated, in the different HDMI device.

Also, a different concept of the present technology is an HDMI device, with a proxy function (function of mediating IP communication and CEC communication), included in an HDMI cluster, the device including: a registration unit to create a database by registering at least an own HDMI CEC logical address, HDMI CEC physical address, and acquisition destination information for acquiring unique information; a first communication unit to receive a database from a different HDMI device included in the HDMI cluster via CEC communication or IP communication; and a first generation unit to generate a database of the HDMI cluster by integrating the database created in the registration unit and the database received in the first communication unit.

The present technology is an HDMI device having a proxy function. In the present technology, the registration unit creates a database by registering at least an own HDMI CEC logical address, HDMI CEC physical address, acquisition destination information for acquiring unique information. For example, the acquisition destination information may be a URL.

The first communication unit receives a database from a different HDMI device included in an HDMI cluster via CEC communication or IP communication. The first generation unit generates a database of an HDMI cluster by integrating a database created in the registration unit and the database received in the first communication unit.

In such a manner, a database of an HDMI cluster in which database databases of HDMI devices are integrated is generated well in the present technology.

Note that, for example, a second communication unit to transmit the database of the HDMI cluster, the database being generated in the first generation unit, to a different HDMI cluster via IP communication may be further included in the present technology. In this case, it becomes possible to generate, in the different HDMI cluster, a database of a network including a plurality of HDMI clusters.

Also, for example, a second communication unit to receive a database of an HDMI cluster, the database being generated in a different HDMI cluster, via IP communication, and a second generation unit to generate a database of a network including a plurality of HDMI clusters by integrating the database of the HDMI cluster which database is generated in the first generation unit and the database of the HDMI cluster which database is received in the second communication unit may be further included in the present technology. In this case, the database of the network including a plurality of HDMI clusters is generated well.

In this case, for example, a third communication unit to transmit the database of the network, the database being generated in the second generation unit, to an external device via IP communication may be further included. For example, the external device may be a mobile device. In this case, it becomes possible for the external device to easily acquire various kinds of information of each HDMI device in an HDMI cluster and to perform utilization thereof for displaying or control operation on the basis of the database of the network.

Effects of the Invention

According to the present technology, it becomes possible to easily acquire and use various kinds of information of each HDMI device in an HDMI cluster. Note that an effect described in the present specification is just an example and not the limitation. Also, there may be an additional effect.

BRIEF DESCRIPTION OF DRAWINGS

FIG. 3 is a chart illustrating an example of a database 1 in which a physical address, a logical address, acquisition destination information for acquiring unique information, and the like are registered.

FIG. 8 is a chart illustrating an example of a database 2 in which unique information of an HDMI device is registered.

MODE FOR CARRYING OUT THE INVENTION

In the following, a mode for carrying out the invention (hereinafter, referred to as "embodiment") will be described. Note that the description will be made in the following order.

1. Embodiment
2. Modification example

<1. Embodiment>
[Configuration Example of Home Network]

Figure 1:
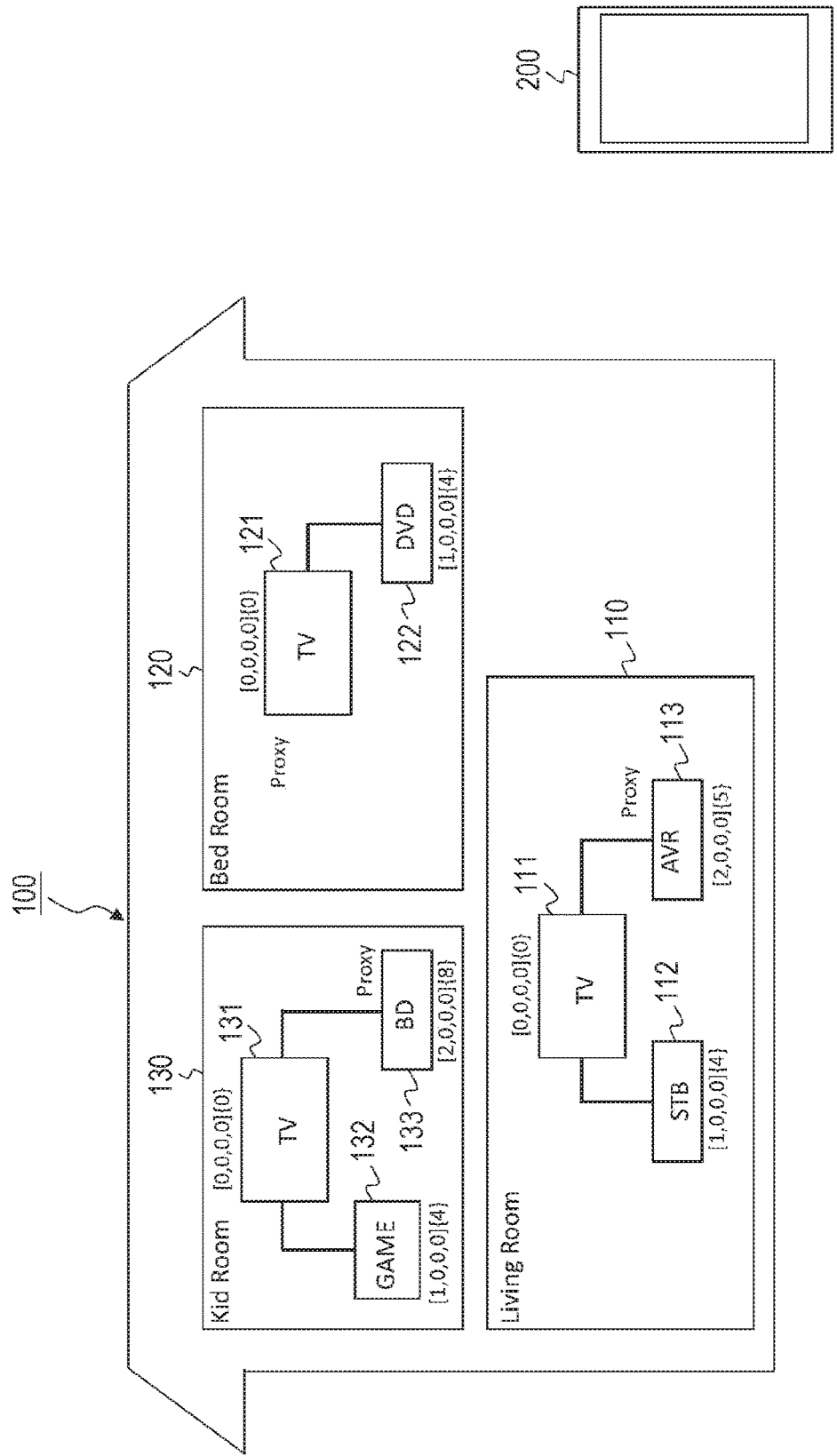
FIG. 1 is a view illustrating a home network and a mobile device as an embodiment.

FIG. 1 is a view illustrating a home network 100 and a mobile device 200. The mobile device 200 is, for example, a mobile terminal such as a smartphone or a tablet. The home network 100 includes three high-definition multimedia interface (HDMI) clusters 110, 120, and 130.

The HDMI cluster 110 is an HDMI network formed in a living room and includes a television receiver 111 as a sink device, and a set-top box 112 and an audio amplifier 113 as source devices. The audio amplifier 113 has a proxy function. The television receiver 111 and the set-top box 112 are connected to each other via an HDMI interface. Also, the television receiver 111 and the audio amplifier 113 are connected to each other via the HDMI interface.

Also, the HDMI cluster 120 is an HDMI network formed in a bedroom and includes a television receiver 121 as a sink device, and a digital versatile disk (DVD) player 122 as a source device. The television receiver 121 has a proxy function. The television receiver 121 and the DVD player 122 are connected to each other via an HDMI interface.

Also, the HDMI cluster 130 is an HDMI network formed in a kid's room and includes a television receiver 131 as a sink device, and a game machine 132 and a Blu-ray disc (BD) player 133 as source devices. The BD player 133 has a proxy function. The television receiver 131 and the game machine 132 are connected to each other via an HDMI interface. Also, the television receiver 131 and the BD player 133 are connected to each other via the HDMI interface.

Note that the HDMI clusters 110, 120, and 130 are mutually connected by wired or wireless local area network (LAN) connection although not illustrated. Also, the HDMI clusters 110, 120, and 130 can be connected to an external network such as the Internet via this LAN connection although not illustrated.

Figure 2:
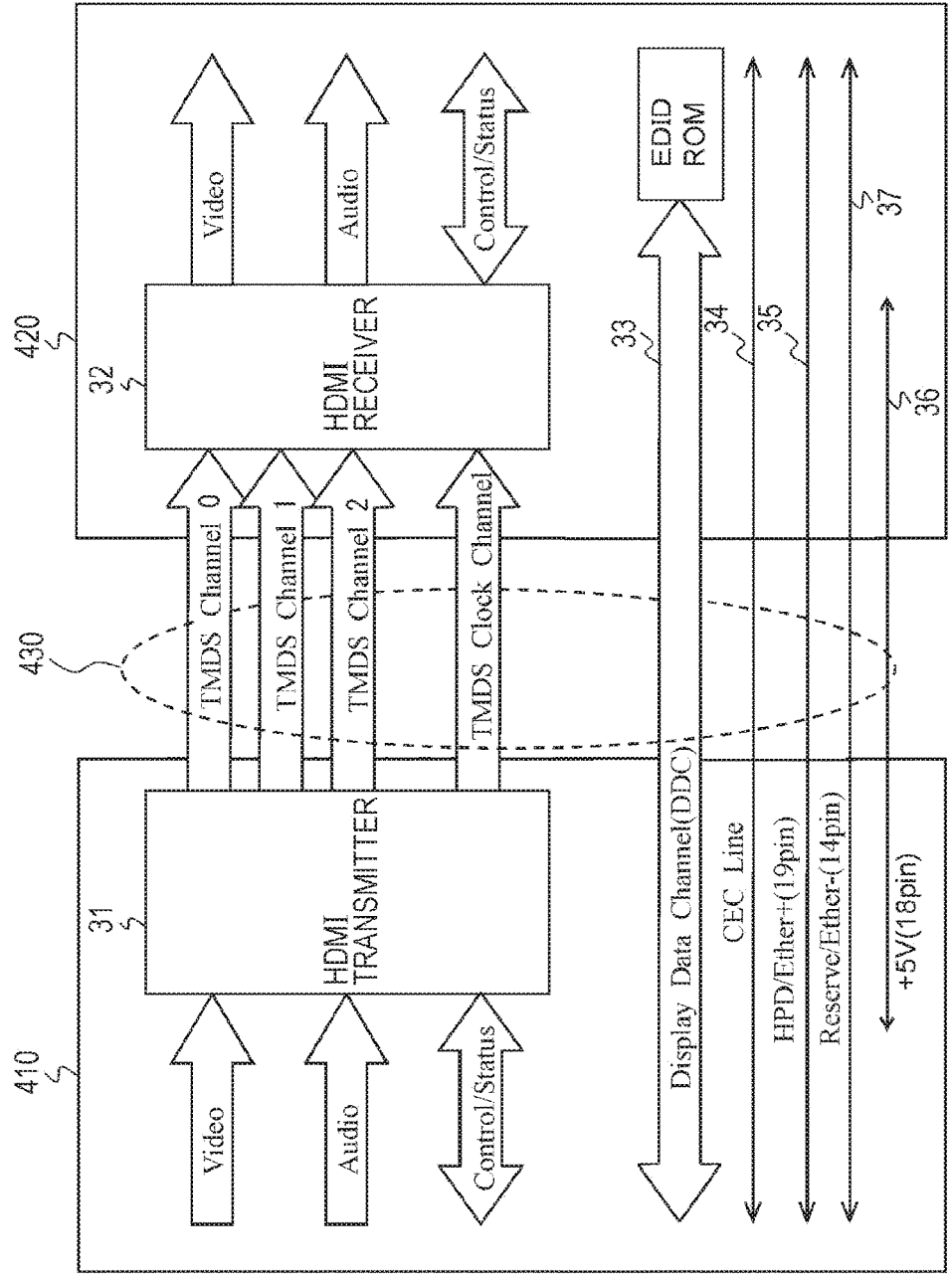
FIG. 2 is a view illustrating a configuration example of an HDMI transmission unit of a source device and an HDMI reception unit of a sink device.

FIG. 2 is a view illustrating a configuration example of an HDMI transmission unit 410 of a source device and an HDMI reception unit 420 of a sink device. In an effective image interval (active video interval) that is an interval from one vertical synchronization signal to a subsequent vertical synchronization signal excluding a horizontal blanking interval and a vertical blanking interval, the HDMI transmission unit 410 transmits a differential signal, which corresponds to pixel data of an uncompressed image in one screen, to the HDMI reception unit 420 in one direction in a plurality of channels. Also, in the horizontal blanking interval or the vertical blanking interval, the HDMI transmission unit 410 transmits a differential signal at least corresponding to audio data associated with an image, control data, different auxiliary data, and the like to the HDMI reception unit 420 in one direction in a plurality of channels.

That is, the HDMI transmission unit 410 includes an HDMI transmitter 31. For example, the transmitter 31 converts pixel data of an uncompressed image into a corresponding differential signal, and performs serial transmission thereof in one direction to the HDMI reception unit 420 by three transition minimized differential signaling (TMDS) channels #0, #1, and #2 that are a plurality of channels.

Also, the HDMI transmitter 31 converts audio data associated with an uncompressed image, necessary control data, different auxiliary data, and the like into a corresponding differential signal and performs serial transmission thereof in one direction to the HDMI reception unit 420 by the three TMDS channels #0, #1, and #2.

In the active video interval, the HDMI reception unit 420 receives a differential signal that is transmitted in one direction from the HDMI transmission unit 410 by the plurality of channels and that corresponds to pixel data. Also, in the horizontal blanking interval or the vertical blanking interval, the HDMI reception unit 420 receives a differential signal that is transmitted in one direction from the HDMI transmission unit 410 by the plurality of channels and that corresponds to audio data or control data.

As a transmission channel of an HDMI system including the HDMI transmission unit 410 and the HDMI reception unit 420, there is a transmission channel called a display data channel (DDC) 33 or a consumer electronics control (CEC) line 34 other than the three TMDS channels #0 to #2 as transmission channels to transmit pixel data and audio data and a TMDS clock channel as a transmission channel to transmit a pixel clock.

The DDC 33 includes two signal lines included in an HDMI cable 430 and is used by the HDMI transmission unit 410 to read extended display identification data (EDID) from the HDMI reception unit 420 connected via the HDMI cable 430. That is, the HDMI reception unit 420 includes, in addition to an HDMI receiver 32, an EDID read only memory (ROM) storing EDID that is configuration capability information related to own configuration capability.

The HDMI transmission unit 410 reads EDID via the DDC 33 from the HDMI reception unit 420 connected via the HDMI cable 430. Then, a control unit (CPU) of a source device recognizes configuration capability of a sink device including the HDMI reception unit 420 on the basis of the EDID.

The CEC line 34 includes one signal line included in the HDMI cable 430 and is used to perform bidirectional communication of control data, that is, CEC communication between a source device and a sink device. Also, the HDMI cable 430 includes an HPD line 35 connected to a pin called hot plug detect (HPD).

By using this HPD line 35, a source device can detect connection of a sink device with DC bias potential. In this case, when seen from a side of the source device, the HPD line 35 has a function of receiving notification of a connection status from the sink device with the DC bias potential. On the other hand, when seen from a side of the sink device, this HPD line has a function of notifying the source device of a connection status with the DC bias potential.

Also, the HDMI cable 430 includes a power supply line 36 used to supply power from the source device to the sink device. Furthermore, the HDMI cable 430 includes a reserved line 37. An HDMI Ethernet channel (HEC) including a pair of differential transmission lines can be configured with the HPD line 35 and the reserved line 37. This channel enables IP communication between the source device and the sink device.

In the HDMI standard, inter-device control using consumer electronics control (CEC) is defined. According to this CEC, various kinds of control can be performed on the basis of a unique physical address and logical address assigned to each device existing on an HDMI network. An HDMI device (CEC-compatible device) acquires an HDMI CEC physical address and an HDMI CEC logical address in HDMI connection. The HDMI CEC physical address (hereinafter, arbitrarily referred to as "physical address") indicates a connection relationship of the HDMI device in an HDMI cluster. Also, the HDMI CEC logical address (hereinafter, arbitrarily referred to as "logical address") indicates a kind of the HDMI device.

In the illustrated example, in the HDMI cluster 110, the television receiver 111 acquires [0, 0, 0, 0] as a physical address and {0} as a logical address, the set-top box 112 acquires [1, 0, 0, 0] as a physical address and {4} as a logical address, the audio amplifier 113 acquires [2, 0, 0, 0] as a physical address and {5} as a logical address.

Also, in the HDMI cluster 120, the television receiver 121 acquires [1, 0, 0, 0] as a physical address and {0} as a logical address, and the DVD player 122 acquires [1, 0, 0, 0] as a physical address and {4} as a logical address.

Also, in the HDMI cluster 130, the television receiver 131 acquires [0, 0, 0, 0] as a physical address and {0} as a logical address, the game machine 132 acquires [1, 0, 0, 0] as a physical address and {4} as a logical address, and the BD player 133 acquires [2, 0, 0, 0] as a physical address and {8} as a logical address.

In this embodiment, a predetermined network device includes a database 1 illustrated in FIG. 3. Here, the predetermined network device is, for example, an HDMI device having a proxy function, the mobile device 200, a server on a cloud, or the like and is not limited to a specific network device. Also, there may be a plurality of predetermined network devices.

At least a physical address, a logical address, and acquisition destination information for acquiring unique information are registered, in this database 1, for each HDMI device in the HDMI clusters 110, 120, and 130. In this embodiment, the acquisition destination information is a uniform resource locator (URL). However, this is not the limitation.

"Date & Time" indicates a date and time of registration. "Logical address" indicates a logical address. "Physical address" indicates a physical address. "Power Status" indicates a power status. "Active Source" indicates an active source. "System Audio Status" indicates a status of a system audio. "OSD Name" indicates a device name displayed on a display. "Proxy Device" indicates whether there is a proxy function. "IP address" indicates an IP address. "Network ID" indicates a network ID (HDMI cluster ID). "URL" indicates a URL as acquisition destination information.

The mobile device 200 performs various kinds of UI displaying on the basis of the database 1. In a case where the mobile device 200 includes the database 1, the database 1 is read from a storage unit thereof and used. On the other hand, in a case where the mobile device 200 does not include the database 1, the database 1 is acquired from an external device (network device) and used.

Figure 4A:
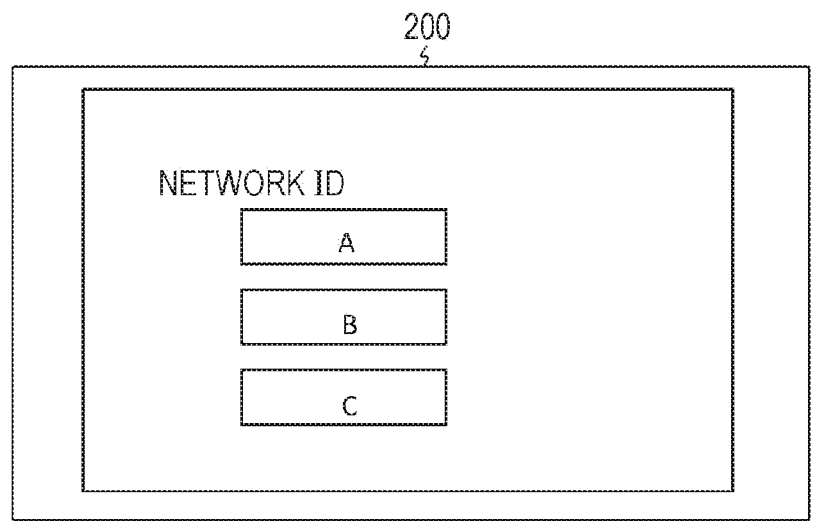
FIGS. 4(a) and 4(b) are views illustrating examples of a UI display of a network ID on a mobile device.
Figure 4B:
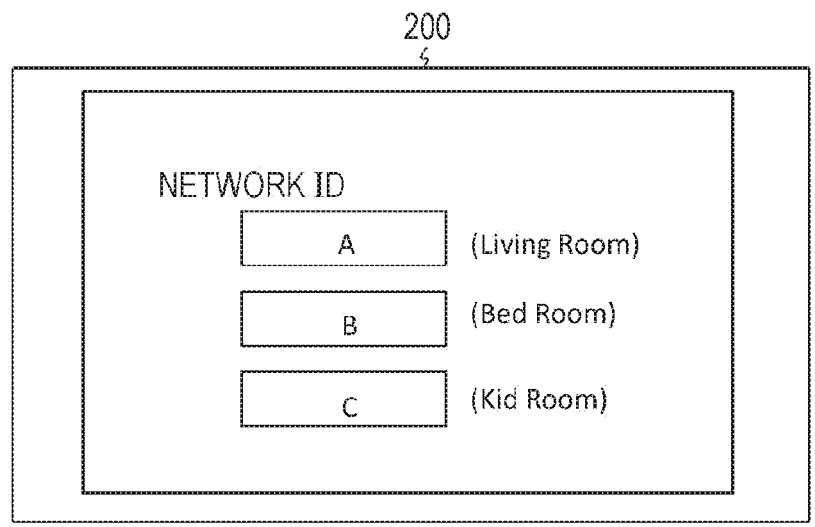

The mobile device 200 displays a selection button of a network ID (HDMI cluster ID) on the basis of information of "Network ID" in the database 1. FIG. 4(a) is a view illustrating an example of a UI display of the network ID. Note that in the illustrated example, only the network ID is displayed. However, for example, information of a correspondence relationship between the network ID and a room may be further registered in the database 1 and a room name may be displayed together as illustrated in FIG. 4(b).

Figure 5:
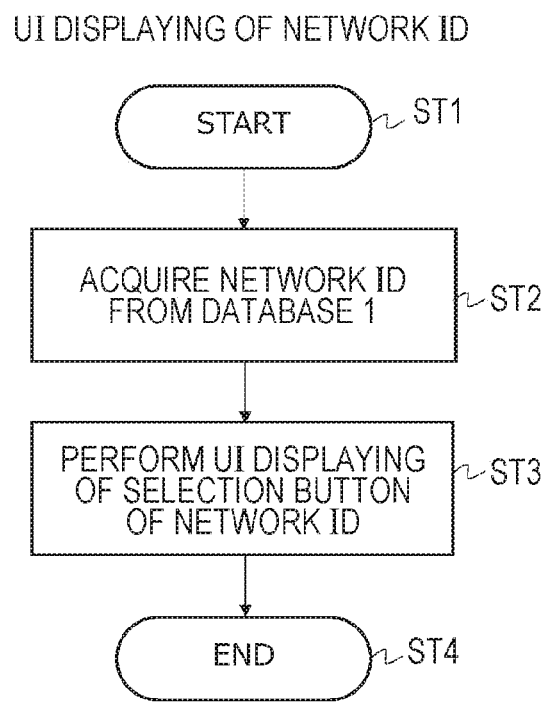
FIG. 5 is a flowchart illustrating an example of a processing procedure for UI displaying of a network ID in the mobile device.

A flowchart in FIG. 5 illustrates an example of a processing procedure for UI displaying of a network ID in the mobile device 200. In step ST1, for example, the mobile device 200 starts processing according to predetermined operation by a user. Subsequently, the mobile device 200 acquires a network ID from the database 1 in step ST2.

Subsequently, in step ST3, the mobile device 200 performs UI displaying of a selection button of the network ID on the basis of the network ID acquired from the database 1 (see FIGS. 4(a) and 4(b)). Then, the mobile device 200 ends the processing in step ST4.

Figure 6:
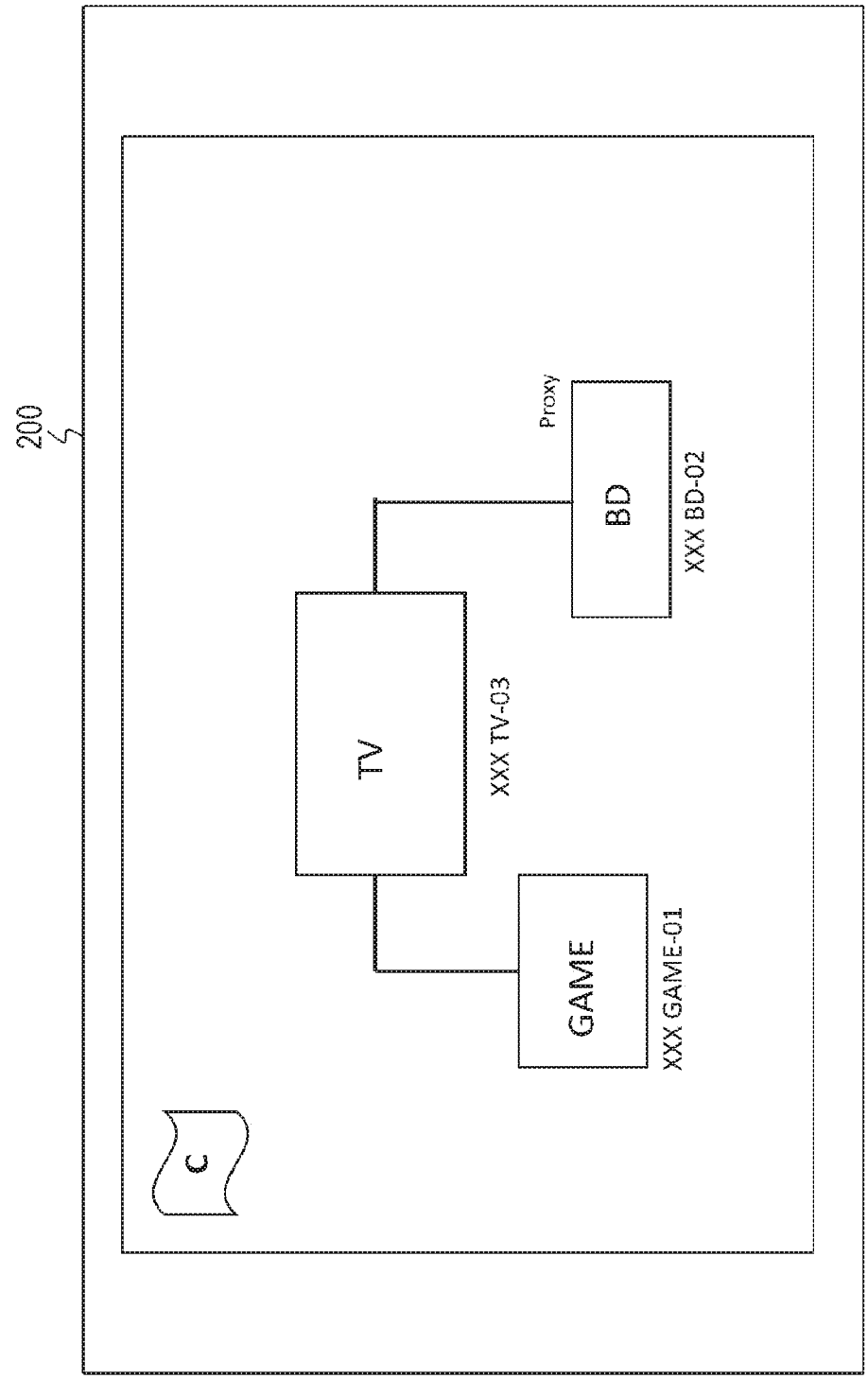
FIG. 6 is a view illustrating an example of a UI display of an HDMI device in an HDMI cluster and a connection status thereof on the mobile device.

In a case where a predetermined HDMI cluster is designated as a predetermined network ID is selected by selection operation by a user in a state in which the selection button of the network ID is displayed on a UI, the mobile device 200 performs UI displaying of an HDMI device in the designated HDMI cluster and a connection status thereof on the basis of the database 1. FIG. 6 is a view illustrating an example of a UI display of an HDMI cluster 130 with a network ID (HDMI cluster ID) being "C."

Figure 7:
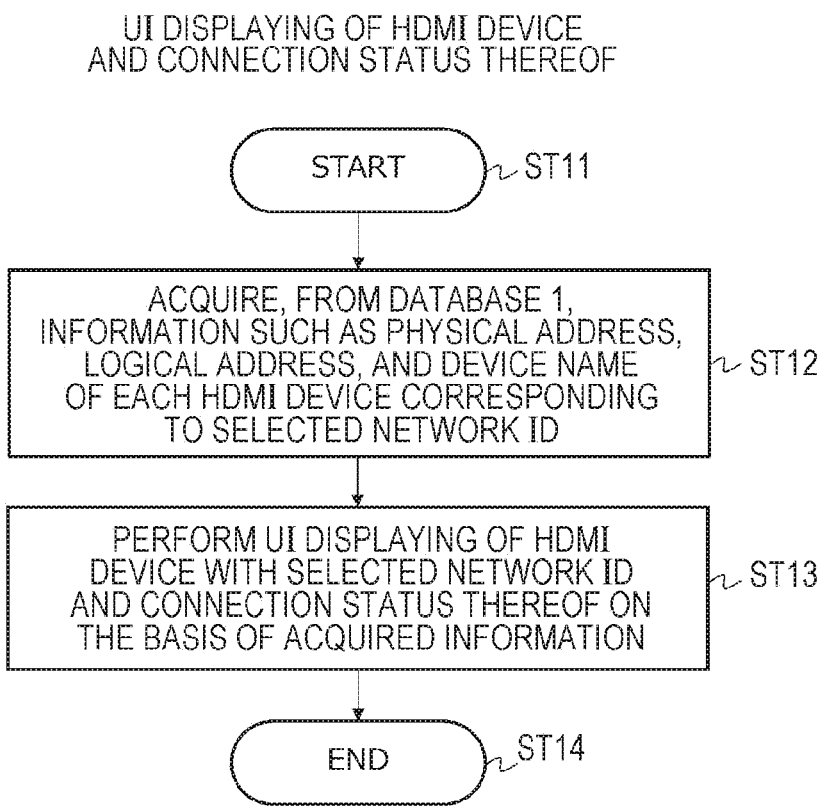
FIG. 7 is a flowchart illustrating an example of a processing procedure for UI displaying of an HDMI device in an HDMI cluster and a connection status thereof on the mobile device.

A flowchart in FIG. 7 illustrates an example of a processing procedure for UI displaying of an HDMI device in an HDMI cluster and a connection status thereof on the mobile device 200. In step ST11, the mobile device 200 starts processing according to operation of selecting a predetermined network ID. Subsequently, in step ST12, the mobile device 200 acquires information such as a physical address, a logical address, and device name information of each HDMI device corresponding to the network ID selected from the database 1.

Subsequently, in step ST13, the mobile device 200 performs UI displaying of an HDMI device with the selected network ID and a connection status thereof on the basis of the acquired information (see FIG. 6). Then, the mobile device 200 ends the processing in step ST14.

Also, in a case where a predetermined HDMI device is designated from the displayed HDMI cluster by user operation, the mobile device 200 acquires a database 2, in which unique information is registered, from an acquisition destination indicated by a URL corresponding to the HDMI device and performs UI displaying thereof. This unique information includes information such as a device category, a manufacturer name, a product name, a corresponding operation key, an icon file, and a product information site related to the HDMI device.

Figure 9:
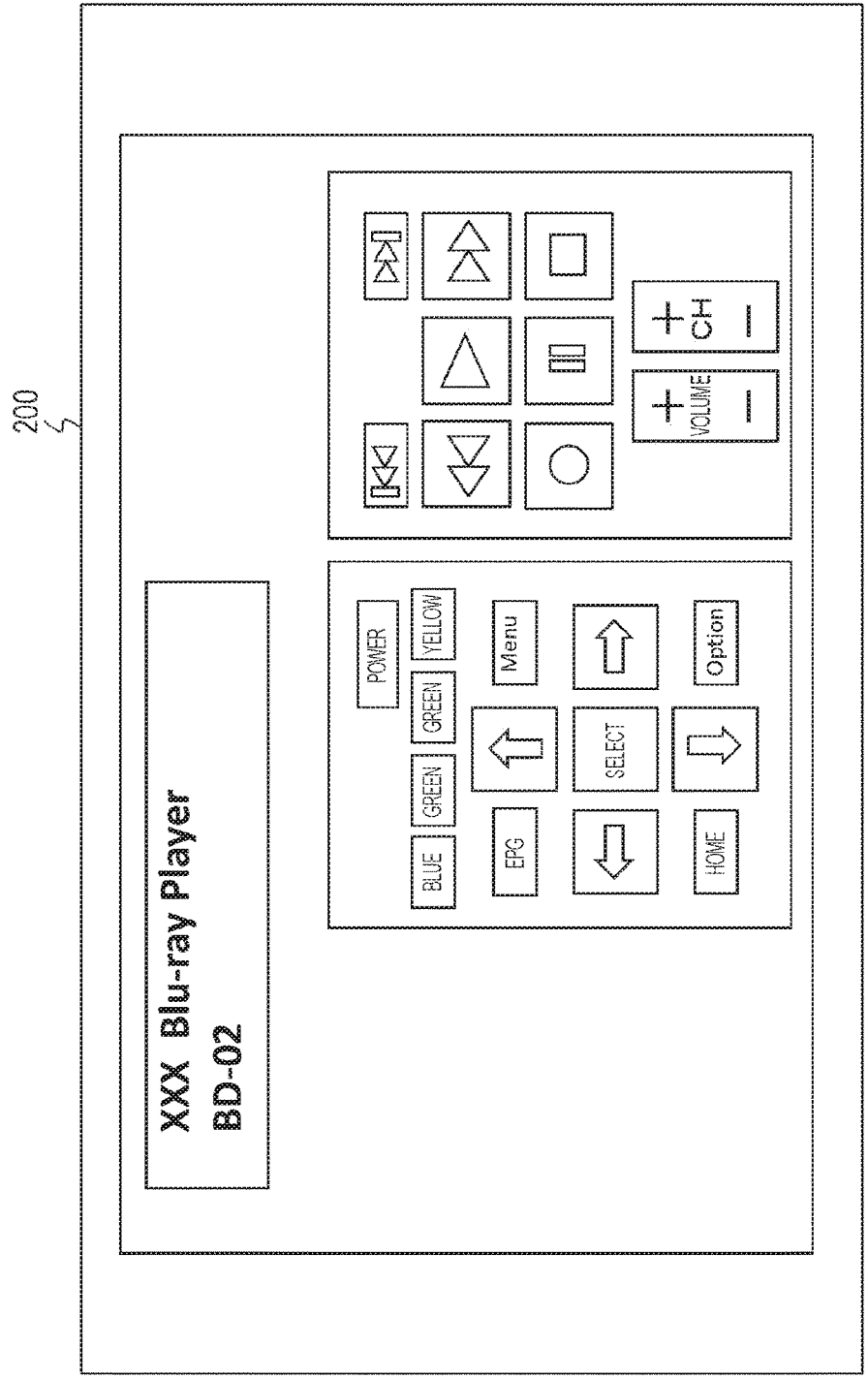
FIG. 9 is a view illustrating an example of a UI display of the unique information of the HDMI device.

FIG. 8 is a chart illustrating an example of a database 2. In the illustrated example, a database 2 corresponding to the BD player 133 in the HDMI cluster 130 is illustrated. Information such as a device category, a manufacturer name, a product name, a corresponding operation key, an icon file, and a product information site is registered. FIG. 9 is a view illustrating an example of a UI display of unique information of an HDMI device. In the illustrated example, an example of a UI display in a case where the HDMI device is the BD player 133 is illustrated.

Figure 10:
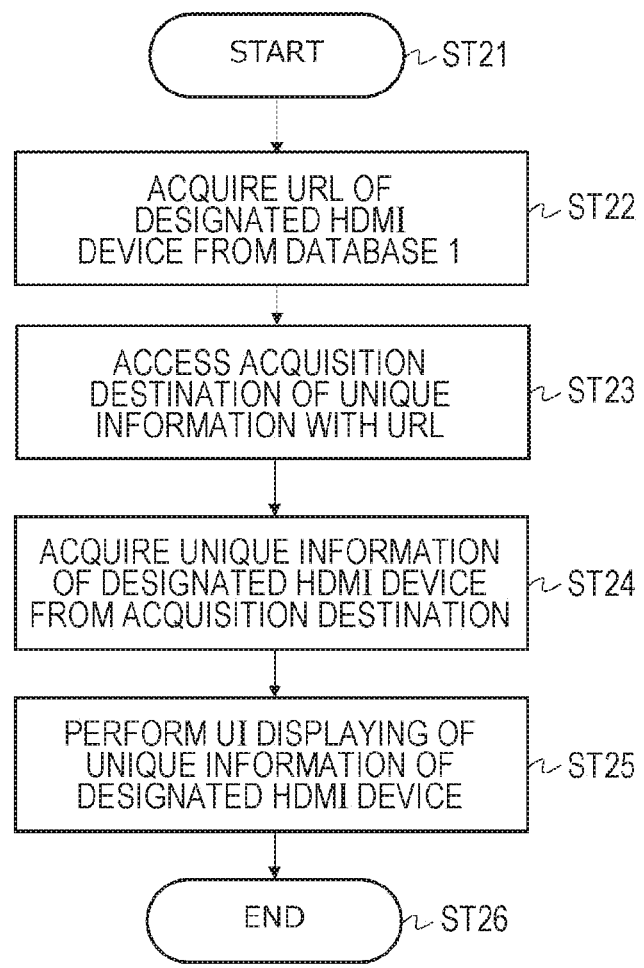
FIG. 10 is a flowchart illustrating an example of a processing procedure for UI displaying of unique information of a designated HDMI device on the mobile device.

A flowchart in FIG. 10 illustrates an example of a processing procedure for UI displaying of unique information of a designated HDMI device on the mobile device 200. In step ST21, the mobile device 200 starts processing according to operation of selecting a predetermined network ID.

Subsequently, the mobile device 200 acquires a URL corresponding to a designated HDMI device from the database 1 in step ST22.

Subsequently, the mobile device 200 accesses an acquisition destination of unique information on the basis of the URL in step ST23. Then, the mobile device 200 acquires unique information of the designated HDMI device from the acquisition destination in step ST24. Subsequently, in step ST25, the mobile device 200 performs UI displaying of the unique information such as a device category, a manufacturer name, a product name, and a corresponding operation key of the designated HDMI device. Then, the mobile device 200 ends the processing in step ST26.

According to pressing operation by a user with respect to the operation key displayed on the UI, the mobile device 200 performs control operation on a corresponding HDMI device. The mobile device 200 executes this control operation via IP communication or by generating a remote control code in an infrared ray or the like.

Figure 11:
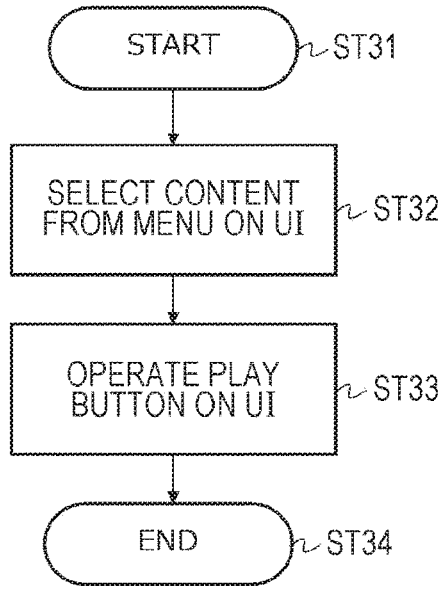
FIG. 11 is a flowchart illustrating an example of control operation by the mobile device.

FIG. 11 is a flowchart illustrating an example of control operation by the mobile device 200. In the illustrated example, control operation on content reproduction is illustrated. The mobile device 200 starts processing in step ST31. Then, in step ST32, the mobile device 200 operates a button of a menu "Menu" on the UI and selects content.

Subsequently, in step ST33, the mobile device 200 operates a play button on the UI and performs reproduction operation. Then, the mobile device 200 ends the processing in step ST34.

In a case where the mobile device 200 itself includes a database 2, the database 2 is used. Also, in a case where the mobile device 200 does not include a database 2, the database 2 is acquired via IP communication from a network device including the database 2 and is used.

Figure 12:
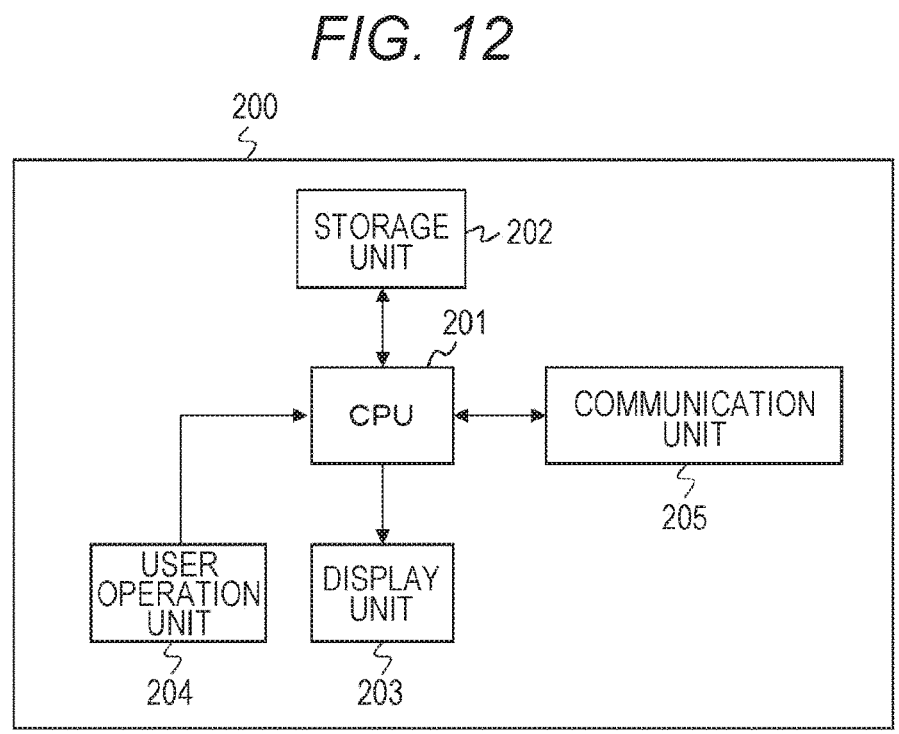
FIG. 12 is a view illustrating a functional block for performing processing related to the database 1 in the mobile device.

FIG. 12 is a view illustrating a functional block for performing processing related to a database 1 in the mobile device 200. The mobile device 200 includes a CPU 201 as a control unit, a storage unit 202, a display unit 203, a user operation unit 204, and a communication unit 205. In a case where the mobile device 200 includes a database 1, the database 1 is read from the storage unit 202 and used. On the other hand, in a case where the mobile device 200 does not include a database 1, the database 1 is acquired by the communication unit 205 from an external device (network device) and used.

In a case where a predetermined HDMI cluster is designated by a user, the CPU 201 performs UI displaying of a kind of an HDMI device related to the designated HDMI cluster and a connection status of the HDMI device on the display unit 203 on the basis of the database 1 (see FIG. 6). In this case, a user uses the user operation unit 204 and performs operation of designating an HDMI cluster (network ID). The user operation unit 204 includes, for example, a touch panel arranged on the display unit 203.

Also, in a case where a predetermined HDMI device is designated by a user from an HDMI cluster displayed on the display unit 203, the CPU 201 transmits acquisition destination information (URL) registered in the database 1 to the communication unit 205. In this case, a user uses the user operation unit 204 and performs operation of designating the HDMI device.

By using this acquisition destination information, the communication unit 205 acquires a database 2, in which unique information of the designated HDMI device is registered, from an external device (network device) and performs transmission thereof to the CPU 201. On the basis of the database 2, the CPU 201 acquires the database 2, in which the unique information is registered, and displays a device category, a manufacturer name, a product name, a corresponding operation key, and the like on the display unit 203 (see FIG. 9).

Also, the CPU 201 performs control operation on the HDMI device according to user operation on the operation key displayed on the UI. In this case, for example, operation of the HDMI device is controlled via IP communication, or operation of the HDMI device is controlled by generation of a remote control code in an infrared ray or the like from a remote control code generation unit (not illustrated).

Figure 13:
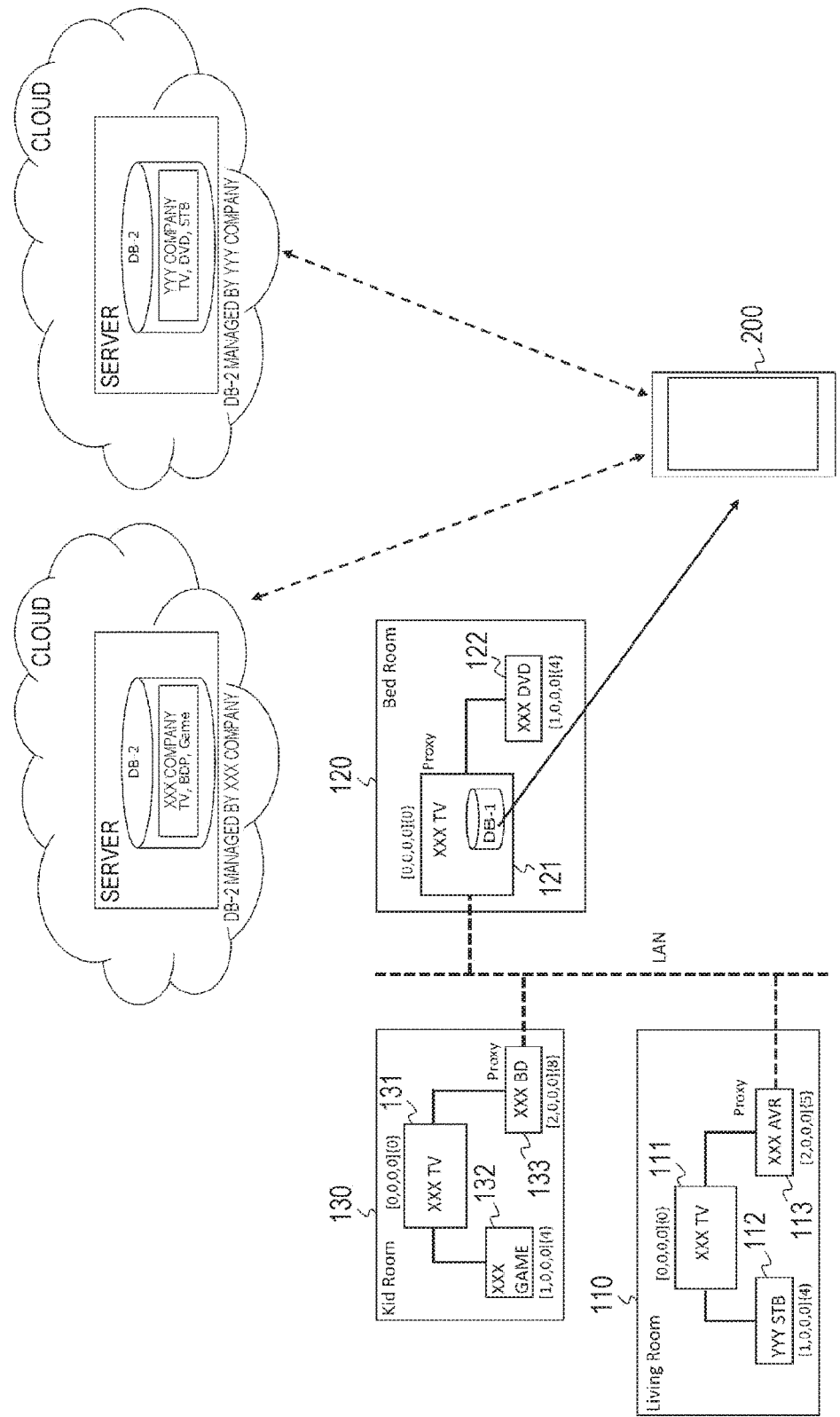
FIG. 13 is a view illustrating an example of a case where a television receiver having a proxy function in an HDMI cluster (HDMI network) generates the database 1 and the database 1 exists in this television receiver.

FIG. 13 is a view illustrating an example in a case where the television receiver 121 having a proxy function in the HDMI cluster (HDMI network) 120 generates a database 1 and the database 1 exists in the television receiver 121. Then, in this example, a database 2 corresponding to each HDMI device of an "XXX company" exists in a server on a cloud which server is managed by the "XXX company" and a database 2 corresponding to each HDMI device of a "YYY company" exists in a server on a cloud which server is managed by the "YYY company."

The mobile device 200 receives the database 1 from the television receiver 121 in the HDMI cluster (HDMI network) 120 via IP communication and uses the database 1. Also, in a case where an HDMI device of the "XXX company" is designated by user operation, the mobile device 200 accesses, by using a URL in the database 1, the server on the cloud which server is managed by the "XXX company." Then, the mobile device 200 receives and uses the database 2 in which unique information of the designated HDMI device is registered. Also, in a case where an HDMI device of the "YYY company" is designated by user operation, the mobile device 200 accesses, by using a URL in the database 1, the server on the cloud which server is managed by the "YYY company." Then, the mobile device 200 receives and uses the database 2 in which unique information of the designated HDMI device is registered.

[Generation of Database 1]

Processing until the television receiver 121 in the HDMI cluster 120 comes to include the database 1 will be described. Processing in the HDMI cluster 110 will be described. The television receiver 111 creates an own database by registering an own physical address, logical address, acquisition destination information for acquiring unique information, and the like to be registered in the database 1, and performs transmission thereof to the audio amplifier 113 having a proxy function via CEC communication using a CEC line or IP communication using an HEC.

The set-top box 112 creates an own database by registering an own physical address, logical address, acquisition destination information for acquiring unique information, and the like to be registered in the database 1, and performs transmission thereof to the audio amplifier 113 having a proxy function via CEC communication using a CEC line or IP communication using an HEC.

Figure 14:
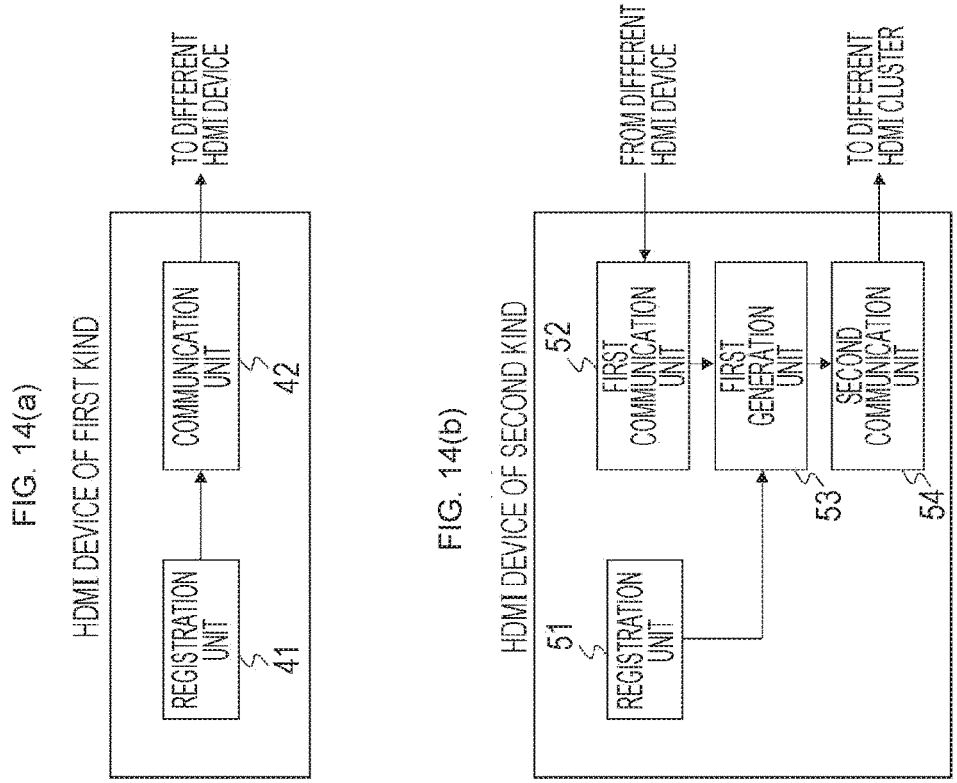
FIGS. 14(a), 14(b) and 14(c) are views for describing configurations of HDMI devices of first to third kinds.

The television receiver 111 and the set-top box 112 configure HDMI devices of a first kind with respect to generation of the database 1. FIG. 14(a) is a view illustrating a functional block included in an HDMI device of the first kind. That is, the HDMI device of the first kind includes a registration unit 41 to create a database by registering a physical address, a logical address, acquisition destination information for acquiring unique information, and the like to be registered in the database 1, and a communication unit 42 to transmit this database created in the registration unit 41 to a different HDMI device via CEC communication or IP communication.

The audio amplifier 113 creates an own database by registering an own physical address, logical address, acquisition destination information for acquiring unique information, and the like to be registered in the database 1. Also, the audio amplifier 113 receives the created databases from the television receiver 111 and the set-top box 112 via CEC communication using a CEC line or IP communication using an HEC. Then, the audio amplifier 113 generates a database of the HDMI cluster 110 by integrating the self-created database and the received databases and performs transmission thereof to the television receiver 121 in the HDMI cluster 120 via IP communication.

The audio amplifier 113 configures an HDMI device of a second kind with respect to generation of the database 1. FIG. 14(b) is a view illustrating a functional block included in an HDMI device of the second kind. That is, the HDMI device of the second kind includes a registration unit 51 to create a database by registering a physical address, a logical address, acquisition destination information for acquiring unique information, and the like to be registered in the database 1, and a first communication unit 52 to receive a created database from a different HDMI device.

Also, the HDMI device of the second kind includes a generation unit 53 to generate a database of an HDMI cluster to which the HDMI device itself belongs by integrating registered information and received information, and a second communication unit 54 to transmit the generated database of the HDMI cluster to a different HDMI cluster.

Processing in the HDMI cluster 130 will be described. The television receiver 131 creates a database by registering own physical address, logical address, acquisition destination information for acquiring unique information, and the like to be registered in the database 1, and performs transmission thereof to the BD player 133 having a proxy function via CEC communication using a CEC line or IP communication using an HEC.

The game machine 132 creates a database by registering own physical address, logical address, acquisition destination information for acquiring unique information, and the like to be registered in the database 1, and performs transmission thereof to the BD player 133 having a proxy function via CEC communication using a CEC line or IP communication using an HEC.

The BD player 133 creates a database by registering own physical address, logical address, acquisition destination information for acquiring unique information, and the like to be registered in the database 1. Also, the BD player 133 receives the created databases from the television receiver 131 and the game machine 132 via CEC communication using a CEC line or IP communication using an HEC. Then, the BD player 133 generates a database of the HDMI cluster 130 by integrating the created database and the received databases, and performs transmission thereof to the television receiver 121 in the HDMI cluster 120 via IP communication.

The television receiver 131 and the game machine 132 configure HDMI devices of the first kind with respect to generation of the database 1 (see FIG. 14(a)). Also, the BD player 133 configures an HDMI device of the second kind with respect to generation of the database 1 (see FIG. 14(b)).

Processing in the HDMI cluster 120 will be described. The DVD player 122 creates a database by registering own physical address, logical address, acquisition destination information for acquiring unique information, and the like to be registered in the database 1, and performs transmission thereof to the television receiver 121 having a proxy function via CEC communication using a CEC line or IP communication using an HEC. The DVD player 122 configures an HDMI device of the first kind with respect to generation of the database 1 (see FIG. 14(a)).

The television receiver 121 creates a database by registering own physical address, logical address, acquisition destination information for acquiring unique information, and the like to be registered in the database 1. Also, the television receiver 121 receives the created database from the DVD player 122 via CEC communication using a CEC line or IP communication using an HEC. Then, the television receiver 121 generates a database of the HDMI cluster 120 by integrating the created database and the received database.

Also, the television receiver 121 receives the generated databases of the HDMI clusters from the HDMI cluster 110 and the HDMI cluster 130 via IP communication. Then, the television receiver 121 generates a database 1 of a network including the HDMI clusters 110, 120, and 130 (see FIG. 3) by integrating the database of the own HDMI cluster 120 and the received databases of the HDMI clusters 110 and 130.

The television receiver 121 configures an HDMI device of a third kind with respect to generation of the database 1. FIG. 14(c) is a view illustrating a functional block included in an HDMI device of the third kind. That is, the HDMI device of the third kind includes a registration unit 61 to create an own database by registering a physical address, a logical address, acquisition destination information for acquiring unique information, and the like to be registered in the database 1, a first communication unit 62 to receive a created database from a different HDMI device, and a first generation unit 63 to generate a database of an HDMI cluster to which the HDMI device itself belongs by integrating the created database and the received database.

Also, the HDMI device of the third kind includes a second communication unit 64 to receive a generated database of an HDMI cluster from a different HDMI cluster, and a second generation unit 65 to generate a database 1 of a network, which includes a plurality of HDMI clusters, by integrating the database of the own HDMI cluster and the received database of the HDMI cluster. Also, the HDMI device of the third kind includes a third communication unit 66 to transmit this database 1 to an external device (such as mobile device).

Figure 15:
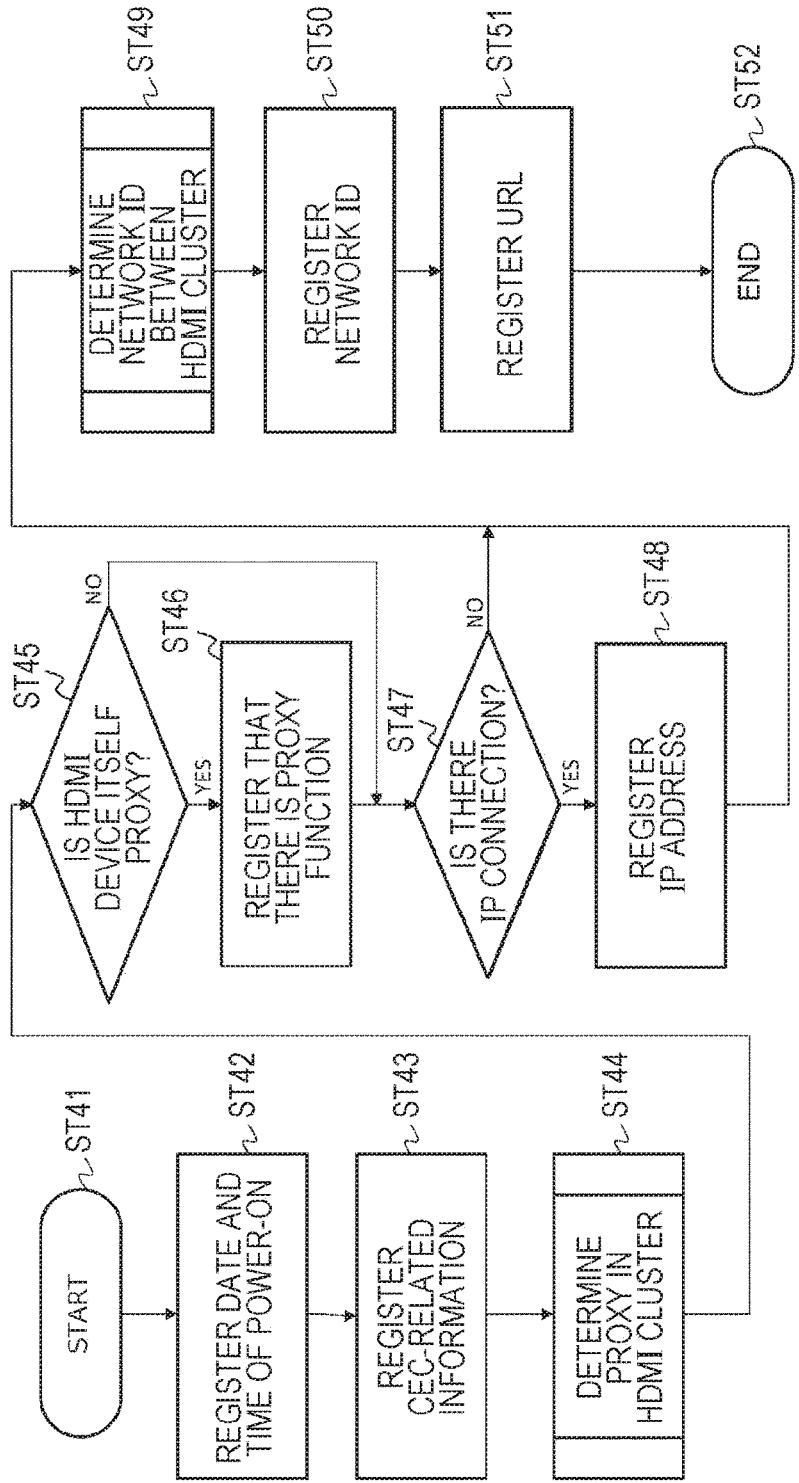
FIG. 15 is a flowchart illustrating an example of a processing procedure of registering various kinds of information which processing procedure is for the HDMI devices of the first to third kinds to create own databases.

A flowchart in FIG. 15 illustrates an example of a processing procedure of registering various kinds of information which processing procedure is for the HDMI devices of the first to third kinds to create own databases. The HDMI device starts processing in step ST41. Subsequently, the HDMI device registers a date and time of power-on in step ST42.

Subsequently, the HDMI device registers CEC-related information, that is, an HDMI CEC physical address, an HDMI CEC logical address, and the like in step ST43. Subsequently, in association with proxy determination in the HDMI cluster in step ST44, the HDMI device determines in step ST45 whether the HDMI device itself is a proxy.

In a case of being a proxy, the HDMI device registers that there is a proxy function in step ST46. After step ST46, the HDMI device proceeds to step ST47. On the other hand, in a case of not being a proxy, the HDMI device immediately proceeds to step 47.

In step ST47, the HDMI device determines whether there is IP connection. In a case where there is the IP connection, the HDMI device registers an IP address in step ST48. After step ST48, the HDMI device proceeds to step ST49. On the other hand, in a case where there is no IP connection, the HDMI device immediately proceeds to step 49.

Subsequently, in association with determination of a network ID between HDMI clusters in step ST49, the HDMI device registers a network ID in step ST50. Subsequently, in step ST51, the HDMI device registers a URL as destination information of unique information. Then, the HDMI device ends the processing in step ST52.

Figure 16:
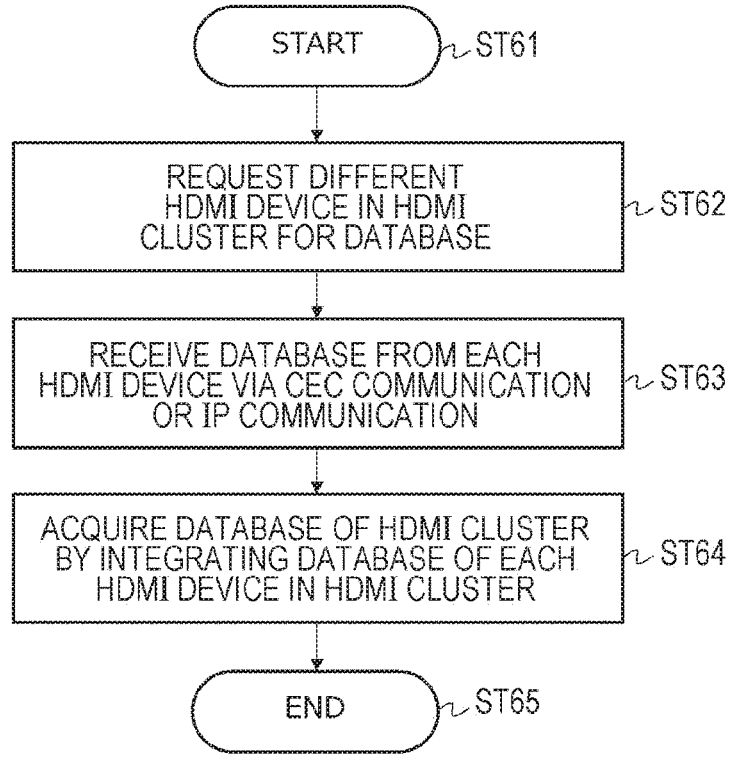
FIG. 16 is a flowchart illustrating an example of a processing procedure for the HDMI device (proxy device) of the second kind to create a database of an HDMI cluster.

A flowchart in FIG. 16 illustrates an example of a processing procedure for an HDMI device of the second kind (proxy device) to create a database of an HDMI cluster. The HDMI device starts processing in step ST61. Subsequently, in step ST62, the HDMI device requests a different HDMI device in an HDMI cluster, in which the HDMI device itself exists, for a database in which various kinds of information are registered.

Subsequently, in step ST63, the HDMI device receives a database from each HDMI device via CEC communication or IP communication. Subsequently, in step ST64, the HDMI device acquires a database of the HDMI cluster by integrating the database received from the different HDMI device and the own database. Then, the HDMI device ends the processing in step ST65.

Figure 17:
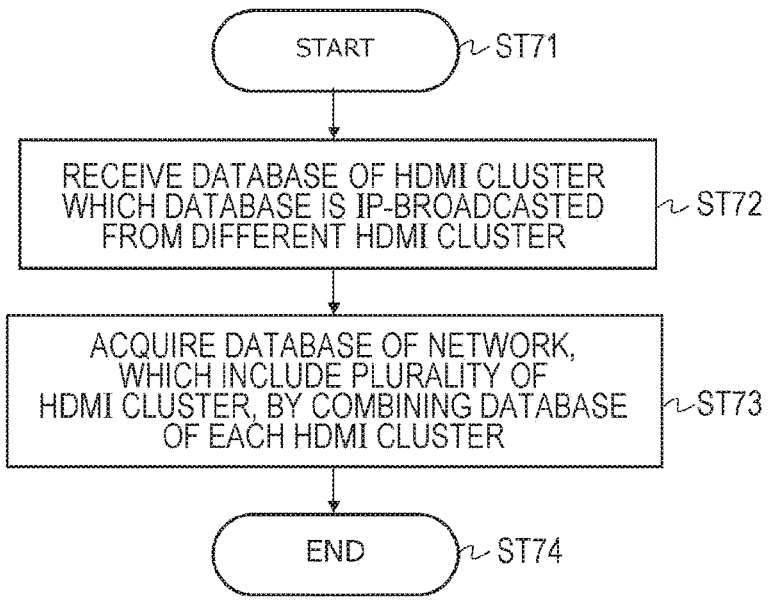
FIG. 17 is a flowchart illustrating an example of a processing procedure for the HDMI device (proxy device) of the third kind to create a database of a network including a plurality of HDMI clusters.

A flowchart in FIG. 17 illustrates an example of a processing procedure for an HDMI device of the third kind (proxy device) to create a database of a network including a plurality of HDMI clusters. The HDMI device starts processing in step ST71. Subsequently, for example, the HDMI device receives an IP-broadcasted database of an HDMI cluster from each HDMI cluster in the network in step ST72.

Subsequently, in step ST73, the HDMI device acquires a database 1 of the network (see FIG. 3) by integrating a database received from a different HDMI cluster and a database of the own HDMI cluster. Then, the HDMI device ends the processing in step ST74.

Figure 18:
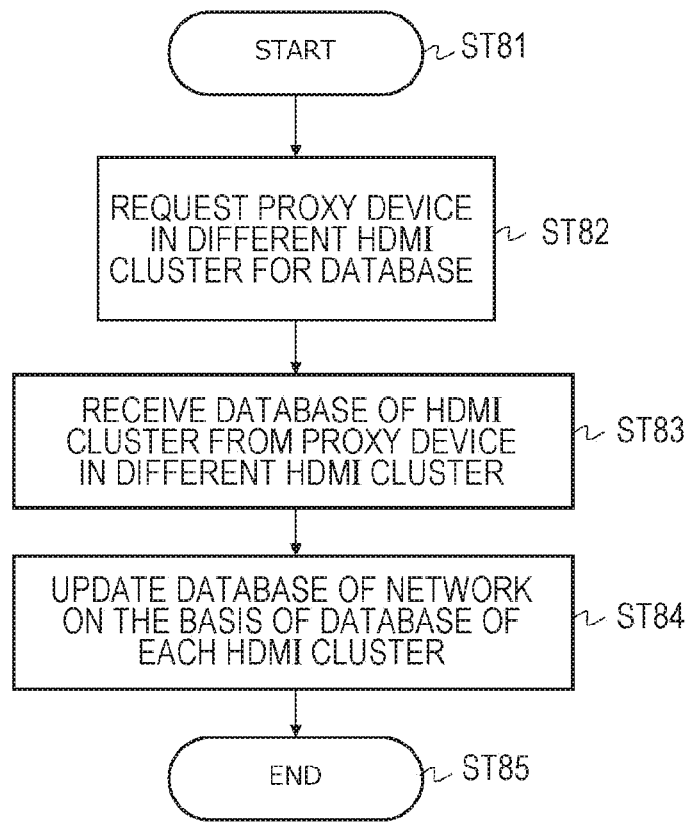
FIG. 18 is a flowchart illustrating an example of a processing procedure in a case where the HDMI device (proxy device) of the third kind periodically updates the database 1.

Note that the HDMI device of the third kind (proxy device) periodically updates the database 1. A flowchart in FIG. 18 illustrates an example of a processing procedure in that case. The HDMI device starts processing in step ST81. Subsequently, the HDMI device requests a proxy device in a different HDMI cluster for a database in step ST82.

Subsequently, the HDMI device receives the database of the HDMI cluster from the proxy device in the different HDMI cluster in step ST83. Subsequently, in step ST84, the HDMI device updates the database 1 of the network on the basis of a database of each HDMI cluster. Then, the HDMI device ends the processing in step ST85.

As described above, the database 1 of the network 100 illustrated in FIG. 1 (see FIG. 3) is held in the HDMI device having the proxy function, the mobile device 200, the server on the cloud, or the like. Then, for each HDMI device in each HDMI cluster included in a network, acquisition destination information (URL) for acquiring unique information is registered in this database 1 together with an HDMI CEC logical address and an HDMI CEC physical address. Thus, the mobile device 200 can easily acquire and use various kinds of information of each HDMI device in each HDMI cluster on the basis of this database 1.

In this case, since the database 1 does not include unique information of each HDMI device, it is possible to avoid an increase in capacity of the database 1. Also, acquisition destination information (URL) for acquiring unique information of each HDMI device is registered in the database 1, and content of the unique information of the HDMI device in the acquisition destination can be freely determined by each manufacturer.

In this case, in a case where it is considered that there is no need to display detailed device information on the mobile device 200, it may be considered that acquisition destination information (URL) itself for acquiring unique information is not registered in the database 1. Also, each manufacturer can determine an acquisition destination such as a server of an own company, the inside of a specific device, and a server in a certain network service by an easily performed method.

<2. Modification Example>

Note that in the above embodiment, the present technology is applied to the home network 100 including a plurality of HDMI clusters. However, it is obvious that a scope of application of the present technology is not limited to such a home network and application to a similar network is possible.

Also, the technology may include the following configurations.

(1) A network device including: a database in which at least an HDMI CEC logical address, an HDMI CEC physical address, and acquisition destination information for acquiring unique information are registered for each HDMI device in an HDMI cluster; and a processing unit to perform processing using the database.

(2) The network device according to (1), in which the processing unit transmits the database to an external device.

(3) The network device according to (2), in which the external device is a mobile device.

(4) The network device according to (1), in which the processing unit performs processing of displaying an HDMI device in an HDMI cluster and a connection status of the HDMI device on the basis of the HDMI CEC logical address and the HDMI CEC physical address and performs processing of acquiring and displaying unique information of a user-designated HDMI device on the basis of the acquisition destination information.

(5) The network device according to (4), further including an operation unit to perform control operation on the user-designated HDMI device on the basis of a display by acquisition of the unique information.

(6) The network device according to any one of (1) to (5), in which the acquisition destination information is a URL.

(7) An information processing method including: a step of reading, from a storage unit, a database in which at least an HDMI CEC logical address, an HDMI CEC physical address, and acquisition destination information for acquiring unique information are registered for each HDMI device in an HDMI cluster; and a step of performing processing using the database.

(8) A network device including: a reception unit to receive a database, in which at least an HDMI CEC logical address, an HDMI CEC physical address, and acquisition destination information for acquiring unique information are registered, from an external device via IP communication; and a processing unit to perform processing of displaying an HDMI device in an HDMI cluster and a connection status of the HDMI device on the basis of the HDMI CEC logical address and the HDMI CEC physical address and to perform processing of acquiring and displaying unique information of a user-designated HDMI device on the basis of the acquisition destination information.

(9) The network device according to (8), further including an operation unit to perform control operation of the user-designated HDMI device on the basis of a display by acquisition of the unique information.

(10) The network device according to (8) or (9), in which the acquisition destination information is a URL.

(11) An information processing method including: a receiving step of receiving a database, in which at least an HDMI CEC logical address, an HDMI CEC physical address, and acquisition destination information for acquiring unique information are registered, by a reception unit from an external device via IP communication; and a processing step of performing processing of displaying an HDMI device in an HDMI cluster and a connection status of the HDMI device on the basis of the HDMI CEC logical address and the HDMI CEC physical address and performing processing of acquiring and displaying unique information of a user-designated HDMI device on the basis of the acquisition destination information.

(12) An HDMI device included in an HDMI cluster, the device including: a registration unit to create a database by registering at least an own HDMI CEC logical address, HDMI CEC physical address, and acquisition destination information for acquiring unique information; and a communication unit to transmit the database created in the registration unit to a different HDMI device included in the HDMI cluster via CEC communication or IP communication.

(13) The HDMI device according to (12), in which the acquisition destination information is a URL.

(14) An HDMI device, with a proxy function, included in an HDMI cluster, the device including: a registration unit to create a database by registering at least an own HDMI CEC logical address, HDMI CEC physical address, and acquisition destination information for acquiring unique information; a first communication unit to receive a database from a different HDMI device included in the HDMI cluster via CEC communication or IP communication; and a first generation unit to generate a database of the HDMI cluster by integrating the database created in the registration unit and the database received in the first communication unit.

(15) The HDMI device according to (14), in which the acquisition destination information is a URL.

(16) The HDMI device according to (14) or (15), further including a second communication unit to transmit the database of the HDMI cluster, the database being generated in the first generation unit, to a different HDMI cluster via IP communication.

(17) The HDMI device according to (14) or (15), further including a second communication unit to receive a database of an HDMI cluster, the database being generated in a different HDMI cluster, via IP communication, and a second generation unit to generate a database of a network including a plurality of HDMI clusters by integrating the database of the HDMI cluster which database is generated in the first generation unit and the database of the HDMI cluster which database is received in the second communication unit.

(18) The HDMI device according to (17), further including a third communication unit to transmit the database of the network, the database being generated in the second generation unit, to an external device via IP communication.

(19) The HDMI device according to (18), in which the external device is a mobile device.

(20) An HDMI device including: a database in which at least an HDMI CEC logical address, an HDMI CEC physical address, and acquisition destination information for acquiring unique information are registered for each HDMI device in an HDMI cluster; and a transmission unit to transmit the database to an external device.

REFERENCE SIGNS LIST

100 Home network
110, 120, 130 HDMI cluster
111, 121, 131 Television receiver
112 Set-top box
113 Audio amplifier
122 DVD player
132 Game machine
133 BD player
200 Mobile device

The invention claimed is:

1. A network device, comprising:
at least one processor configured to:
create a database for a plurality of high-definition multimedia interface (HDMI) devices in an HDMI cluster;
register at least an HDMI consumer electronics control (CEC) logical address, an HDMI CEC physical address, an HDMI cluster ID, and acquisition destination information, corresponding to each of the plurality of HDMI devices in the created database,
wherein the HDMI cluster ID identifies the HDMI cluster, and
wherein the acquisition destination information is for acquisition of unique information of a corresponding HDMI device; and
control a display device to display the HDMI CEC logical address, the HDMI CEC physical address, the HDMI cluster ID, and the acquisition destination information, based on the created database.

2. The network device according to claim 1, wherein the at least one processor is further configured to transmit the created database to an external device.

3. The network device according to claim 2, wherein the external device is a mobile device.

4. The network device according to claim 1, wherein the at least one processor is further configured to:
determine a connection status of an HDMI device of the plurality of HDMI devices based on a corresponding HDMI CEC logical address and a corresponding HDMI CEC physical address;
control the display device to display the connection status of the HDMI device;
acquire corresponding unique information of a user-designated HDMI device of the plurality of HDMI devices based on corresponding acquisition destination information; and
control the display device to further display the corresponding unique information of the user-designated HDMI device.

5. The network device according to claim 4, wherein the at least one processor is further configured to control operation on the user-designated HDMI device based on the display of the corresponding unique information.

6. The network device according to claim 1, wherein the acquisition destination information is a URL.

7. An information processing method, comprising:
reading, from a storage unit, a database for a plurality of high-definition multimedia interface (HDMI) devices in an HDMI cluster,
wherein at least an HDMI consumer electronics control (CEC) logical address, an HDMI CEC physical address, an HDMI cluster ID, and acquisition destination information, corresponding to each of the plurality of HDMI devices are registered in the database,
wherein the HDMI cluster ID identifies the HDMI cluster, and
wherein the acquisition destination information is for acquisition of unique information of a corresponding HDMI device; and displaying, on a display device, the HDMI CEC logical address, the HDMI CEC physical address, the HDMI cluster ID, and the acquisition destination information based on the database.

8. A network device, comprising:
at least one processor configured to:
receive a database for a plurality of high-definition multimedia interface (HDMI) devices in an HDMI cluster, from an external device via IP communication,
wherein at least an HDMI consumer electronics control (CEC) logical address, an HDMI CEC physical address, an HDMI cluster ID, and acquisition destination information, corresponding to each of the plurality of HDMI devices are registered in the database,
wherein the HDMI cluster ID identifies the HDMI cluster, and
wherein the acquisition destination information is for acquisition of unique information of a corresponding HDMI device;
control a display device to display the HDMI CEC logical address, the HDMI CEC physical address, the HDMI cluster ID, and the acquisition destination information of each of the plurality of HDMI devices, based on the received database;
determine a connection status of an HDMI device of the plurality of HDMI devices based on a corresponding HDMI CEC logical address and a corresponding HDMI CEC physical address;
acquire corresponding unique information of a user-designated HDMI device of the plurality of HDMI devices based on corresponding acquisition destination information; and
control a display device to further display the connection status of the HDMI device and the corresponding unique information of the user-designated HDMI device.

9. The network device according to claim 8, wherein the at least one processor is further configured to control operation on the user-designated HDMI device based on the display of the corresponding unique information.

10. The network device according to claim 8, wherein the acquisition destination information is a URL.

11. An information processing method, comprising:
receiving a database corresponding to each of a plurality of high-definition multimedia interface (HDMI) devices in an HDMI cluster, from an external device via IP communication,
wherein at least an HDMI consumer electronics control (CEC) logical address, an HDMI CEC physical address, an HDMI cluster ID, and acquisition destination information corresponding to each of the plurality of HDMI devices, are registered in the database,
wherein the HDMI cluster ID identifies the HDMI cluster, and
wherein the acquisition destination information is for acquisition of unique information of a corresponding HDMI device;
displaying the HDMI CEC logical address, the HDMI CEC physical address, the HDMI cluster ID, and the acquisition destination information of each of the plurality of HDMI devices;
determining a connection status of an HDMI device of the plurality of HDMI devices based on a corresponding HDMI CEC logical address and a corresponding HDMI CEC physical address;
acquiring corresponding unique information of a user-designated HDMI device of the plurality of HDMI devices based on corresponding acquisition destination information; and
displaying further the connection status of the HDMI device and the corresponding unique information of the user-designated HDMI device.

12. A first HDMI device, comprising:
at least one processor configured to:
create a database corresponding to the first high-definition multimedia interface (HDMI) device included in an HDMI cluster;
register at least an HDMI consumer electronics control (CEC) logical address, an HDMI CEC physical address, an HDMI cluster ID, and acquisition destination information corresponding to the first HDMI device, in the created database,
wherein the HDMI cluster ID identifies the HDMI cluster, and
wherein the acquisition destination information is for acquisition of unique information of a corresponding HDMI device; and
transmit the database created by the first HDMI device to a second HDMI device included in the HDMI cluster via at least one of CEC communication or IP communication.

13. The first HDMI device according to claim 12, wherein the acquisition destination information is a URL.

14. A first HDMI device, comprising:
at least one processor configured to:
create a first database corresponding to the first high-definition multimedia interface (HDMI) device included in a first HDMI cluster,
wherein the first HDMI device is with a proxy function,
register at least an HDMI consumer electronics control (CEC) logical address, an HDMI CEC physical address, an HDMI cluster ID, and acquisition destination information, corresponding to the first HDMI device in the first database,
wherein the HDMI cluster ID identifies the first HDMI cluster, and
wherein the acquisition destination information is for acquisition of unique information of a corresponding HDMI device;
receive a second database from a second HDMI device included in the first HDMI cluster via at least one of CEC communication or IP communication; and
generate a third database of the first HDMI cluster based on a first integration of the first database and the second database.

15. The first HDMI device according to claim 14, wherein the acquisition destination information is a URL.

16. The first HDMI device according to claim 14, wherein the at least one processor is further configured to transmit the third database of the first HDMI cluster to a second HDMI cluster via IP communication.

17. The first HDMI device according to claim 14, wherein the at least one processor is further configured to:
receive a fourth database of a second HDMI cluster via IP communication; and
generate a fifth database of a network including a plurality of HDMI clusters based on a second integration of the third database of the first HDMI cluster and the fourth database of the second HDMI cluster.

18. The first HDMI device according to claim 17, wherein the at least one processor is further configured to transmit the fifth database of the network to an external device via IP communication.

19. The first HDMI device according to claim 18, wherein the external device is a mobile device.

20. An HDMI device, comprising:
   at least one processor configured to:
      create a database for a plurality of high-definition multimedia interface (HDMI) devices in an HDMI cluster;
      register at least an HDMI consumer electronics control (CEC) logical address, an HDMI CEC physical address, an HDMI cluster ID, and acquisition destination information, corresponding to each of the plurality of HDMI devices in the created database, wherein the HDMI cluster ID identifies the HDMI cluster, and
      wherein the acquisition destination information is for acquisition of unique information of a corresponding HDMI device; and
      transmit the created database to an external device.

* * * * *